(12) United States Patent
Goodwin et al.

(10) Patent No.: US 9,133,065 B2
(45) Date of Patent: Sep. 15, 2015

(54) HIGH EFFICIENCY MAGNESIUM FERTILIZER

(71) Applicant: COMPASS MINERALS MANITOBA, INC., Winnipeg (CA)

(72) Inventors: Mark Goodwin, Winnipeg (CA); Kerry Green, Winnipeg (CA)

(73) Assignee: COMPASS MINERALS MANITOBA INC., Winnipeg, MB (CA)

(*) Notice: Subject to any disclaimer, the term of this patent is extended or adjusted under 35 U.S.C. 154(b) by 0 days.

(21) Appl. No.: 14/332,035

(22) Filed: Jul. 15, 2014

(65) Prior Publication Data
US 2015/0027183 A1 Jan. 29, 2015

Related U.S. Application Data

(60) Provisional application No. 61/857,345, filed on Jul. 23, 2013.

(51) Int. Cl.
| | |
|---|---|
| A01C 1/06 | (2006.01) |
| C05D 5/00 | (2006.01) |
| C05B 17/00 | (2006.01) |
| C05D 1/00 | (2006.01) |
| C05G 3/00 | (2006.01) |

(52) U.S. Cl.
CPC . C05B 17/00 (2013.01); A01C 1/06 (2013.01); C05D 1/00 (2013.01); C05D 5/00 (2013.01); C05G 3/0041 (2013.01)

(58) Field of Classification Search
CPC .......................................................... C05D 9/02
USPC ........................................................ 71/31–63
See application file for complete search history.

(56) References Cited

U.S. PATENT DOCUMENTS

| | | | |
|---|---|---|---|
| 4,834,957 A * | 5/1989 | Van de Walle | 423/268 |
| 5,264,017 A | 11/1993 | Van de Walle | |
| 6,214,795 B1 * | 4/2001 | Benjamin et al. | 514/9.1 |
| 6,826,866 B2 * | 12/2004 | Moore et al. | 47/48.5 |
| 8,241,387 B2 * | 8/2012 | Shah | 71/8 |
| 8,814,976 B2 * | 8/2014 | Pedersen | 71/31 |
| 2004/0035162 A1 * | 2/2004 | Williams et al. | 71/28 |
| 2007/0087937 A1 * | 4/2007 | Leatherman et al. | 504/101 |
| 2008/0153703 A1 * | 6/2008 | Kubota et al. | 504/125 |
| 2012/0067094 A1 * | 3/2012 | Pursell et al. | 71/29 |

FOREIGN PATENT DOCUMENTS

| | | | |
|---|---|---|---|
| CN | 103483105 | * | 1/2014 |
| EP | 0673903 | | 9/1995 |
| WO | 03071855 | | 9/2003 |
| WO | 2010135814 | | 12/2010 |

* cited by examiner

*Primary Examiner* — Wayne Langel
(74) *Attorney, Agent, or Firm* — McKee, Voorhees & Sease, PLC

(57) ABSTRACT

A high efficiency magnesium fertilizer and a method for applying the same to an agronomic carrier or directly to soil. The magnesium fertilizer product is a powder comprising two or more forms of magnesium mixed with a suitable formulating agent.

18 Claims, 2 Drawing Sheets

HIGH EFFICIENCY MAGNESIUM FERTILIZER

CROSS-REFERENCE TO RELATED APPLICATIONS

The instant application claims the priority benefit under 35 U.S.C. §119(e) of U.S. Provisional Patent Application 61/857,345, filed Jul. 23, 2013, which is incorporated by reference herein.

FIELD OF THE INVENTION

The present invention relates generally to the field of fertilizers. More specifically, the present invention relates to a magnesium fertilizer demonstrating increased efficiency, that is, increased uptake by plants.

BACKGROUND OF THE INVENTION

Prior art methods of using magnesium fertilizers typically involve a single source of magnesium, either prilled, granulated or mined agglomerates (hereafter referred to as granular) of various sources of magnesium, dolomitic limestone, magnesium potassium sulphate, magnesium carbonate or magnesium oxide. These materials are most often applied by themselves in a broadcast application through fertilizer spreaders. Due to their granular format, excessive amounts of these products need to be applied to ensure even coverage throughout the field and availability to all plants. Specifically, granules break down slowly and inefficiently as only the outer surface of the granule is exposed to the soil.

In some cases, a few higher quality grade magnesium sources are mixed with other granular nutrient fertilizers and broadcast or banded through traditional seeding equipment or spreaders. While this increases their soil coverage efficiency to a degree, it is still limited by the fact that they have a relative small surface area and thus plant availability is limited. Another drawback to granular application is that there is limited movement of magnesium within the soil and thus there is often a substantial time lag for the roots of a plant to reach a zone in the soil where the magnesium product is present.

An added problem is that in some types of soils, the soil chemistry is such that the applied nutrient remains inert and unavailable.

Accordingly, one of the keys to effective and efficient uptake of magnesium is to have it close to the seed so that the plant may absorb it very early in its growth cycle.

This invention has as a primary objective preparation, use and application of a magnesium fertilizer at high efficiency uptake levels. The method, composition and means for accomplishing this primary objective as well as others will be apparent from the following description.

SUMMARY OF THE INVENTION

According to a first aspect of the invention, there is provided a magnesium fertilizer product comprising:
  from about 1 to about 96% (w/w) fast uptake form of magnesium;
  from about 1 to about 96% (w/w) slow uptake form of magnesium; and
  from about 3 to about 15% (w/w) formulating agent,
  said fertilizer product being ground so as to pass through at least 100 mesh, U.S. standard sieve.

In other embodiments, the fertilizer product may be ground so that the fertilizer product passes through at least 325 mesh, U.S. standard sieve.

The fertilizer product can then be applied to a suitable agronomic carrier or product, as discussed herein.

Alternatively, the magnesium fertilizer product may be:
  from about 30 to about 50% (w/w) fast uptake form of magnesium;
  from about 30 to about 60% (w/w) slow uptake form of magnesium; and
  from about 3 to about 15% (w/w) formulating agent.

The formulating agent may be a sulfonate condensate, preferably naphthalene sulfonate condensate.

The fast uptake form of magnesium may be magnesium sulphate or magnesium chloride, etc.

The slow uptake form of magnesium may be magnesium carbonate or magnesium oxide, etc.

According to a second aspect of the invention, there is provided a method of preparing a magnesium fertilizer product comprising:
  mixing from about 1 to about 96% (w/w) fast uptake form of magnesium;
  from about 1 to about 96% (w/w) slow uptake form of magnesium; and
  from about 3 to about 15% (w/w) formulating agent,
  wherein the fast uptake form, the slow uptake form and the formulating agent are ground so as to pass through at least 100 mesh, U.S. standard sieve.

In some embodiments, the magnesium fertilizer product may be ground so as to pass through at least 325 mesh, U.S. standard sieve.

Alternatively, the magnesium fertilizer product may be:
  from about 30 to about 50% (w/w) fast uptake form of magnesium;
  from about 30 to about 60% (w/w) slow uptake form of magnesium; and
  from about 3 to about 15% (w/w) formulating agent.

According to a third aspect of the invention, there is provided a method of promoting root formation and elongation in a plant comprising:
  applying a magnesium fertilizer product to the soil, said magnesium fertilizer product comprising:
  from about 1 to about 96% (w/w) fast uptake form of magnesium;
  from about 1 to about 96% (w/w) slow uptake form of magnesium; and
  from about 3 to about 15% (w/w) formulating agent,
  wherein the fast uptake form, the slow uptake form and the formulating agent are ground so as to be at least 100 mesh or smaller; and
  allowing the plant to grow.

Alternatively, the magnesium fertilizer product may be:
  from about 30 to about 50% (w/w) fast uptake form of magnesium;
  from about 30 to about 60% (w/w) slow uptake form of magnesium; and
  from about 3 to about 15% (w/w) formulating agent, In some embodiments, the magnesium fertilizer product may be applied to the soil as a coated seed of the plant to be grown.

Preferably, the plant is a germinating plant or seedling, that is, a plant in need of a start-up or pop-up fertilizer. That is, the plant may be a recently planted plant, seed or seedling.

The magnesium fertilizer product may be applied to the soil as a coated agronomic carrier.

The agronomic carrier or agronomic product may be selected from the group consisting of a seed; a fertilizer powder; a fertilizer granule; a fertilizer prill; a nitrogen granule; a potassium granule; a phosphate granule; corn grit; paper granules; and a sulfur product. It is of note that this list is illustrative and other suitable agronomic carriers and products will be readily apparent to one of skill in the art.

According to a fourth aspect of the invention, there is provided a method of preparing a magnesium fertilizer coated agronomic carrier comprising:

applying to an agronomic carrier a mixture of from about 1 to about 96% (w/w) fast uptake form of magnesium; from about 1 to about 96% (w/w) slow uptake form of magnesium; and from about 3 to about 15% (w/w) formulating agent, wherein the fast uptake form, the slow uptake form and the formulating agent are ground so as to pass through at least 100 mesh U.S. standard sieve at from about 0.3 to about 2.0% (w/w) of the agronomic carrier.

DESCRIPTION OF THE PREFERRED EMBODIMENTS

Figure 1:
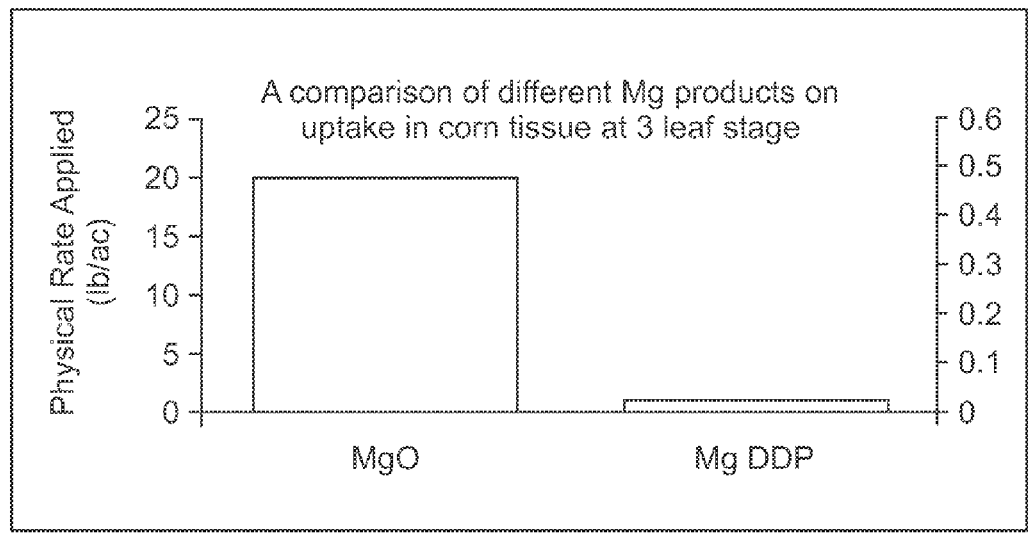
FIG. 1 is a bar graph demonstrating that less magnesium can be used if applied using the magnesium fertilizer product described herein than is used with traditional applications of magnesium.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, and are intended to be within its scope, the preferred methods and materials are now described. All publications mentioned herein are incorporated herein by reference.

Described herein is a magnesium fertilizer product or powder and a method for applying the same to an agronomic carrier.

High magnesium content in the soil can interfere with the uptake of other nutrients, such as potash, so it is beneficial to provide only what the plant needs for an early start, and then allow the plant to access naturally occurring magnesium in the soil during the remainder of growth.

The applicant has discovered that by a process that involves refinement and co-formulating of three sources of Mg, it is possible to apply this element for plant nutritional purposes in a fashion that allows for plant growth to a level that only typically would be seen using tens of pounds of granular Mg. The technique involves powdering a fast uptake form and a slow uptake from a "fast" and a "slow" source of Mg—MgSO4 (fast), Mg Oxide or Mg Carbonate (slowly available), and co-formulating it with sticking agents so that it sticks to and coats N P and K granules that would be applied in the normal course of fertilization. The coating puts the Mg in close proximity to roots when the plant is small and when nutrition is very critical to survival. This allows for extended feeding of the more slowly available forms. This type of benefit is very important to the plant as magnesium is the central cation in chlorophyll, the substance that allows plants to photosynthesize, as discussed above.

Specifically, as discussed herein, in some embodiments, the magnesium fertilizer product is a powder comprising two or more forms of magnesium mixed with a suitable formulating agent. The magnesium fertilizer product can be applied directly to the soil or can be used to coat an agronomic carrier, as discussed below.

Specifically, in embodiments in which the magnesium fertilizer product or powder is applied directly to the soil, it may be banded in the soil. That is, the magnesium fertilizer product may be applied as a concentrated band adjacent to the seed row.

Alternatively, the magnesium fertilizer powder is applied directly to a suitable agronomic carrier, as discussed herein. In most embodiments, no binder is added or applied to the agronomic carrier as the magnesium fertilizer powder will adhere directly to the agronomic carrier.

As early stated, used herein, "agronomic carrier" refers to a product that is suitable for coating with a magnesium fertilizer powder. As will be appreciated by one of skill in the art, suitable agronomic carriers include but are by no means limited to a seed, a fertilizer powder, a fertilizer granule, a fertilizer prill or mined matter such as nitrogen (prill) granules, a potassium (prill) granules, a phosphate granules (prill), corn grit, paper granules, sulfur products, or any material that will not inhibit plant growth.

As discussed herein, the magnesium fertilizer product of the invention allows for the application of much lower rates of magnesium than with prior art fertilizer products while still providing adequate crop nutrition. Put another way the magnesium fertilizer is of high efficiency. As will be appreciated by one of skill in the art, magnesium is a naturally occurring material, and consequently any reduction in the usage of magnesium in the short term is beneficial in the long term.

Unusually high magnesium content in the soil can interfere with the uptake of other nutrients, such as potash, so it is beneficial to provide only what the plant needs for an early start, and then allow the plant to access naturally occurring magnesium in the soil during the remainder of growth.

By applying the magnesium product to soil as described herein, the number of interception points whereby a root can encounter magnesium is increased by orders of magnitude over that seen with traditional granular magnesium fertilizer products, thereby allowing for higher efficiency in the application than that seen with prior art methods of magnesium application. That is, rather than providing granules which break down slowly, the method of the invention provides finely divided high surface area magnesium at more locations throughout the soil, thereby increasing the likelihood that the roots of a growing plant in need of magnesium, particularly a recently planted plant or seed or seedling, will encounter some in the soil.

As will be appreciated by one of skill in the art, the use of a fine powder or finely divided powder of magnesium has the further advantage over granular forms of providing increased surface area of magnesium or increased levels of plant-usable magnesium in the soil. This results in two benefits: first, the magnesium is more evenly distributed over the soil, meaning that some of the magnesium is "close" to each and every seed or plant compared to application of a traditional granular magnesium fertilizer which, as discussed above, would need to break down from its granular form and dissipate or disperse through the soil and second, that by being "closer", the plant is able to access the magnesium earlier in its growth cycle, which is often under more trying weather conditions (cold soils) than weather conditions later in the growing season. The early availability of magnesium provides a burst of growth that allows the plant to forage for other nutrients quicker due to its enhanced root development, as discussed herein.

In other embodiments of the invention, the magnesium is a mixture of multiple sources of magnesium. For example, the mixture may comprise some immediately available forms of magnesium, for example, magnesium sulphate and some more slowly available forms of magnesium, for example, magnesium carbonate and magnesium oxide, so that the plant will be able to access the nutrient over time. As will be appreciated by one of skill in the art, varying percentages of fast uptake and slow uptake magnesium may be used in accordance with the expected growth conditions. For example, when planted into cool, wet soils, plant development is slowed. Consequently, a higher percentage of fast uptake magnesium may be used so as to promote increased root mass which will in turn improve the plant's ability to forage for nutrients.

The nutrient powder may be 100 mesh or finer and the nutrient powder may be applied at from about 0.1 to about 2.5% w/w of the agronomic carrier. In other embodiments, the nutrient powder may be applied at from about 0.1 to about 2.0% or from about 0.3 to about 2.5% or from about 0.3 to about 2.0%.

In some embodiments, total guaranteed analysis of the powder may be between 25 percent and 40 percent, by weight.

As discussed above, a formulating agent, for example, a sulfonate condensate or condensed sulfonate, preferably a naphthalene sulfonate condensate is added to the magnesium mixture to maintain the integrity of the adherence of the product to the surface of the agronomic carrier without degrade of the fertilizer. Such naphthalene sulfonate condensates are well known in the art and are sold commercially under various trade names as of this filing, including but by no means limited to AGNIQUE™, AGNIQUE™ NSC 11NP, MORWET™, MORWET™ D-425, LOMAR™D and ARMAK™ 2106.

The formulating agents support the efficacy (efficiency) of the magnesium fertilizer product by keeping the particles from clumping.

Furthermore, it has surprisingly been found that the formulating agents also act to slow chemical interactions between the magnesium and coated materials as well as with agents within the soil that can chemically modify the magnesium in the magnesium fertilizer product from a plant-available form to an unavailable form and thus reduces its effectiveness. It has also been discovered that the formulating agents help to convert some of the magnesium, for example, the magnesium oxide, into plant available forms and to keep the magnesium in this plant available form for an extended period of time. The surfactant property of the formulating agents essentially reduce the reactivity of the magnesium in the fertilizer product with the other nutrients applied to the soil as well as with those already present in the soil. That is, while not wishing to be bound to a particular theory or hypothesis, it is believed that the formulating agent lowers the pH of the magnesium which slows the conversion of the magnesium in the fertilizer product of the invention into a plant available form. This effectively allows the magnesium to "last longer", that is, to be taken up more slowly by the plant, which means that the magnesium is available to the plant for a longer period of time. It is believed that in its powder form, the magnesium of the fertilizer product has a pH of approximately 5.5-6.5, which is 0.5 to 0.9 pH units lower than otherwise because of the formulating agent.

According to an aspect of the invention, there is provided a magnesium fertilizer product comprising:
from about 1 to about 96% (w/w) fast uptake form of magnesium;
from about 1 to about 96% (w/w) slow uptake form of magnesium; and
from about 3 to about 15% (w/w) formulating agent,
said fertilizer product being ground so as to be at least through a 100 mesh U.S. standard sieve.

Alternatively, the fertilizer product may be ground so as to be at least through a 325 mesh, U.S. standard sieve.

Alternatively, the magnesium fertilizer product may be:
from about 30 to about 50% (w/w) fast uptake form of magnesium;
from about 30 to about 60% (w/w) slow uptake form of magnesium; and
from about 3 to about 15% (w/w) formulating agent, The formulating agent may be a sulfonate condensate, preferably naphthalene sulfonate condensate, as discussed above; it has been found to provide best handling and plant uptake properties and is therefore preferred.

The fast uptake form of magnesium may be magnesium sulphate or another suitable form of magnesium that is immediately ready for uptake by a growing or emerging plant, such as magnesium chloride.

The slow uptake form of magnesium may be magnesium carbonate or magnesium oxide or another suitable form of magnesium that is more slowly taken up by growing plants than the fast uptake form of magnesium.

As will be appreciated by one of skill in the art, "fast uptake" and "slow uptake" are relative terms. In other words, a fast uptake form need only be more readily plant-available than the slow uptake form to be considered a fast uptake form for purposes of this invention.

Furthermore, the amount of fast uptake and slow uptake may be varied to accommodate any of a number of variables, for example, type of plant, rate of growth, soil conditions and/or expected early growth conditions.

According to another aspect of the invention, there is provided a method of preparing a magnesium fertilizer product comprising:
mixing from about 1 to about 96% (w/w) fast uptake form of magnesium;
from about 1 to about 96% (w/w) slow uptake form of magnesium; and
from about 3 to about 15% (w/w) formulating agent,
wherein the fast uptake form, the slow uptake form and the formulating agent are ground so as to be at least through 100 mesh, U.S. Standard sieve.

In alternative embodiments, the magnesium fertilizer product is ground so as to be at least through a 325 mesh, U.S. standard sieve.

According to another aspect of the invention, there is provided a method of preparing a magnesium fertilizer product comprising:
mixing from about 30 to about 50% (w/w) fast uptake form of magnesium;
from about 30 to about 60% (w/w) slow uptake form of magnesium; and
from about 3 to about 15% (w/w) formulating agent,
wherein the fast uptake form, the slow uptake form and the formulating agent are ground so as to be at least 100 mesh.

According to another aspect of the invention, there is provided a method of promoting root formation and elongation in a plant comprising:
applying a magnesium fertilizer product to the soil, said magnesium fertilizer product comprising:
from about 1 to about 96% (w/w) fast uptake form of magnesium;
from about 1 to about 96% (w/w) slow uptake form of magnesium; and
from about 3 to about 15% (w/w) formulating agent,
wherein the fast uptake form, the slow uptake form and the formulating agent are ground so as to be at least through 100 mesh; and
allowing the plant to grow.

Alternatively, the magnesium fertilizer product may be:
from about 30 to about 50% (w/w) fast uptake form of magnesium;
from about 30 to about 60% (w/w) slow uptake form of magnesium; and
from about 3 to about 15% (w/w) formulating agent.

Preferably, the plant is a germinating seed, a germinating seedling or a germinating plant. That is, preferably the plant is a plant that is just beginning to grow.

As discussed herein, the magnesium fertilizer product may be applied to the soil as a coated agronomic product or carrier.

The agronomic carrier or agronomic product may be selected from the group consisting of a seed; a fertilizer powder; a fertilizer granule; a fertilizer prill; a nitrogen granule; a potassium granule; a phosphate granule; corn grit; paper granules; and a sulfur product. It is of note that this list is illustrative and other suitable agronomic carriers and products will be readily apparent to one of skill in the art.

According to another aspect of the invention, there is provided a method of preparing a magnesium fertilizer coated agronomic product comprising:
applying a mixture of from about 1 to about 96% (w/w) fast uptake form of magnesium; from about 1 to about 96% (w/w) slow uptake form of magnesium; and from about 3% to about 15% (w/w) formulating agent, wherein the fast uptake form, the slow uptake form and the formulating agent are ground so as to be at least 100 mesh and are applied directly to the agronomic product at from about 0.1% to about 2.5% (w/w) of the agronomic product.

Alternatively, a mixture of from about 30 to about 50% (w/w) fast uptake form of magnesium; from about 30 to about 60% (w/w) slow uptake form of magnesium; and from about 3 to about 15% (w/w) formulating agent, may be used.

Alternatively, the fast uptake form, the slow uptake form and the formulating agent may be ground so as to be at least through a 325 mesh.

As discussed above, the agronomic product is selected from the group consisting of a seed; a fertilizer powder; a fertilizer granule; a fertilizer prill; a nitrogen granule; a potassium granule; a phosphate granule; corn grit; paper granules; and a sulfur product.

Specifically, as will be appreciated by one of skill in the art, there are several apparent drawbacks to using a fine powder magnesium fertilizer product compared to a granular product. For example, there is the cost of additional grinding, as well as additional handling and loss of product. Furthermore, while the increased surface area of the fine powder provides greater potential for uptake by the root zones of the plants, the increased surface area also provides increased targets to be modified by other agents within the soil.

Thus, while a granule is cheaper to manufacture, the granule must break down in the soil and must not be chemically modified to a plant-unavailable form in the soil. As discussed above, the fine powder magnesium fertilizer product is in a size that is more plant-available. Furthermore, the addition of the formulating agent(s) improves availability by preventing modification by other agents in the soil by changing the pH of the magnesium and also by promoting dispersion of the magnesium fertilizer product when it comes into contact with the soil. As magnesium is critical in photosynthesis and more magnesium is made available to the plant, the end result is improved plant growth, for example, increased root mass, as discussed below.

As will be appreciated by one of skill in the art, the carrier and powder need to mix either in a blender or auger for a minimum of 20 seconds (blender), or 1 meter (yard) auger to provide an even coating. The coating rate is determined by the surface area of the carrier but could range from about 0.375% w/w (corn and soybean seeds), to about 1.0% (typical commercial fertilizer), to about 2.5% (forage seeds, greens grade fertilizers)

EXAMPLES

In utilizing this method and this product, the user is able to attain equal or better uptake of magnesium in the plant with less product applied.

The invention will now be described by way of examples; however, the invention is not necessarily limited to the examples. In the examples, the percentages were 32% $MgSO_4$, 59% MgO and $MgCO_3$.

FIG. 1 shows a physical rate of granular magnesium oxide (applied at 20 lbs. per acre) and an application of the powdered magnesium applied at 0.75 lbs. per acre. Note that the amounts of magnesium in the crop plant as expressed by percent of Mg in tissue are higher when the lower rate of the fertilizer product (0.48) of the invention is used versus the granular magnesium oxide (0.45) despite much more magnesium being applied per acre.

Figure 2:
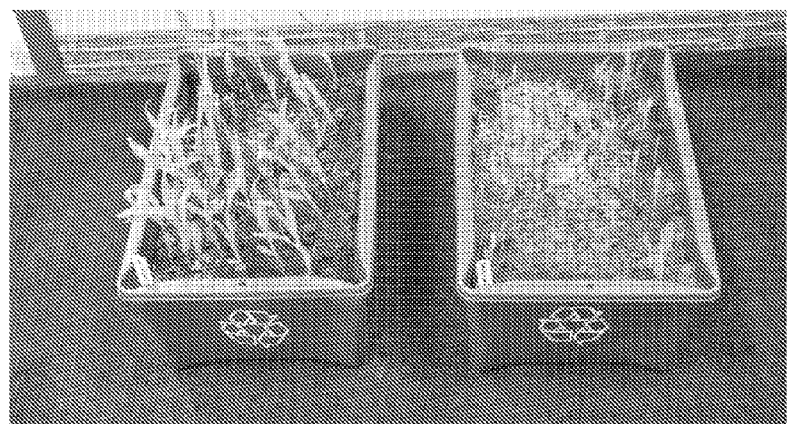
FIG. 2 is a comparison of plant growth demonstrating that less magnesium can be used if applied using the product described herein and the associated benefits to early plant growth. Left—magnesium fertilizer product of the invention. Right—traditional Potassium/magnesium granule.

This type of benefit is very important to the plant as magnesium is the central cation in chlorophyll, the substance that allows plants to photosynthesize, as discussed above. This is evidenced in FIG. 2, which shows the value of using the magnesium fertilizer product of the invention versus traditional magnesium granular fertilizer. Specifically, plants in the left panel were supplied the magnesium fertilizer product of the invention while plants in the right panel were not. As can be seen, the plants in the left panel emerged more quickly and grew more than the ones in the right panel.

Figure 3:
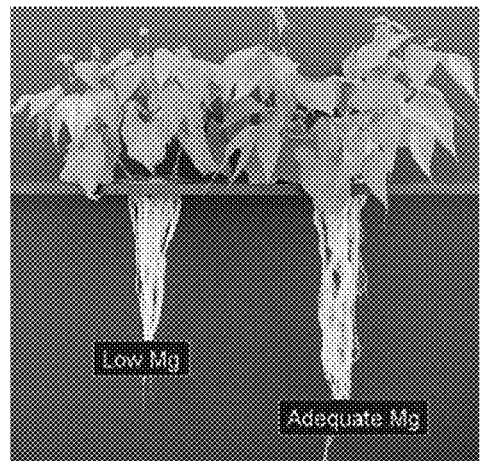
FIG. 3 shows that magnesium deficiency is manifested in root growth impedance as opposed to shoot growth effects.
Figure 4:
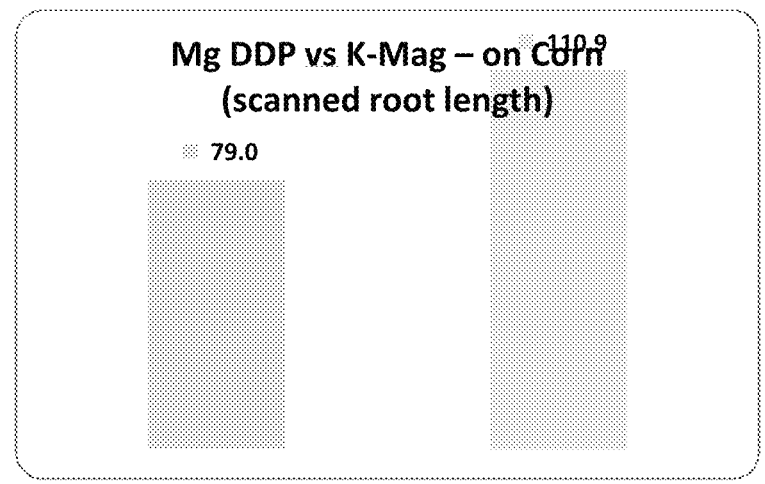
FIG. 4 shows that Mg deficiency in roots is corrected more effectively using a fraction of the rates applied with traditional granular Mg products.

Further evidence in terms of benefit of the invention can be deduced from using root growth as a bio indicator. Past work by Cakmak "Magnesium—A Forgotten Element in Crop Production", Better Crops, Vol. 94, 2010 #2, pp. 24-25, (see FIG. 3) shows that a lack of magnesium can cause plant growth to be impeded underground due to lower and/shorter root mass but will look "normal" above ground. As can be seen from FIGS. 3 and 4, the magnesium fertilizer product described herein is far better than the prior art granular products at overcoming this type of deficiency, resulting in longer roots (MGDDP sample).

While the preferred embodiments of the invention have been described above, it will be recognized and understood that various modifications may be made therein, and the appended claims are intended to cover all such modifications which may fall within the spirit and scope of the invention.

What is claimed is:

1. A magnesium fertilizer product comprising:
   from about 30% to about 50% (w/w) fast uptake form of magnesium, said fast uptake form being selected from the group consisting of magnesium sulphate and magnesium chloride;
   from about 30% to about 60% (w/w) slow uptake form of magnesium said slow uptake form of magnesium being selected from the group consisting of magnesium carbonate and magnesium oxide; and
   from about 3% to about 15% (w/w) sulfonate condensate, said fertilizer product being ground so as to pass through at least a 100 mesh, U.S. standard sieve.

2. The magnesium fertilizer of claim 1 wherein the sulfonate condensate is naphthalene sulfonate condensate.

3. The magnesium fertilizer product according to claim 1 wherein the fertilizer product is ground so as to pass through at least a 325 mesh, U.S. standard sieve.

4. A method of preparing a magnesium fertilizer product comprising:
   from about 30% to about 50% (w/w) fast uptake form of magnesium, wherein the fast uptake form of magnesium is selected from the group consisting of magnesium sulphate and magnesium chloride;
   from about 30% to about 60% (w/w) slow uptake form of magnesium, wherein the slow uptake form of magnesium is magnesium carbonate or magnesium oxide; and
   from about 3% to about 15% (w/w) sulfonate condensate, wherein the fast uptake form, the slow uptake form and the sulfonate condensate are ground so as to pass through at least a 100 mesh, U.S. standard sieve.

5. The method according to claim 4 wherein the sulfonate condensate is naphthalene sulfonate condensate.

6. The method according to claim 4 wherein the fast uptake form, the slow uptake form and the formulating agent are ground so as to pass through at least a 325 mesh, U.S. standard sieve.

7. A method of promoting root formation and elongation in a plant comprising:
   applying a magnesium fertilizer product to the soil, said magnesium fertilizer product comprising:
      from about 30% to about 50% (w/w) fast uptake form of magnesium, wherein the fast uptake form of magnesium is magnesium sulphate;
      from about 30% to about 60% (w/w) slow uptake form of magnesium, wherein the slow uptake form of magnesium is selected from the group consisting of magnesium carbonate or magnesium oxide; and
      from about 3% to about 15% (w/w) sulfonate condensate,
   wherein the fast uptake form, the slow uptake form and the formulating agent are ground so as to pass through at least a 100 mesh, U.S. standard sieve;
   planting a seed or seedling in said soil; and
   allowing the seed or seedling to grow.

8. The method according to claim 7 wherein the sulfonate condensate is a naphthalene sulfonate condensate.

9. The method according to claim 7 wherein the magnesium fertilizer product is applied to the soil as a coated agricultural product.

10. The method according to claim 4 wherein the agricultural product is selected from the group consisting of a seed; a fertilizer powder; a fertilizer granule; a fertilizer prill; a nitrogen granule; a potassium granule; a phosphate granule; corn grit; paper granules; and a sulfur product.

11. The method according to claim 7 wherein the fast uptake form, the slow uptake form and the formulating agent are ground so as to pass through at least a 325 mesh, U.S. standard sieve.

12. A method of preparing a magnesium fertilizer coated agronomic product comprising:
    applying a mixture of from about 30% to about 50% (w/w) fast uptake form of magnesium, wherein the fast uptake form of magnesium is selected from the group consisting of magnesium sulphate and magnesium chloride;
    from about 30% to about 60% (w/w) slow uptake form of magnesium, wherein the slow uptake form of magnesium is selected from the group consisting of magnesium carbonate and magnesium oxide; and
    from about 3% to about 15% (w/w) sulfonate condensate,
    wherein the fast uptake form, the slow uptake form and the sulfonate condensate are ground so as to pass through at least a 100 mesh U.S. standard sieve and the mixture is applied to the agronomic product at from about 0.1 to about 2.5% (w/w) of the agronomic product.

13. The method according to claim 12 wherein the sulfonate condensate is a naphthalene sulfonate condensate.

14. The method according to claim 12 wherein the agronomic product is selected from the group consisting of a seed; a fertilizer powder; a fertilizer granule; a fertilizer prill; a nitrogen granule; a potassium granule; a phosphate granule; corn grit; paper granules; and a sulfur product.

15. The method according to claim 12 wherein the mixture is ground so as to pass through at least a 325 mesh, U.S. standard sieve.

16. The method according to claim 12 wherein the mixture is applied to the agronomic product at from about 0.3% to about 2.5% (w/w) of the agronomic product.

17. The method according to claim 12 wherein the mixture is applied to the agronomic product at from about 0.3% to about 2.0% (w/w) of the agronomic product.

18. The method according to claim 12 wherein the mixture is applied to the agronomic product at from about 0.1 to about 2.0% (w/w) of the agronomic product.

* * * * *